(12) United States Patent
Ohkoshi et al.

(10) Patent No.: US 9,005,569 B2
(45) Date of Patent: Apr. 14, 2015

(54) MICROSTRUCTURE AND MANUFACTURING METHOD THEREFOR

(75) Inventors: Shin-ichi Ohkoshi, Tokyo (JP); Deepa Dey, Tokyo (JP); Yoshihide Tsunobuchi, Tokyo (JP); Kazuhito Hashimoto, Tokyo (JP); Hiroko Tokoro, Tokyo (JP); Fumiyoshi Hakoe, Tokyo (JP)

(73) Assignee: The University of Tokyo, Tokyo (JP)

( * ) Notice: Subject to any disclaimer, the term of this patent is extended or adjusted under 35 U.S.C. 154(b) by 508 days.

(21) Appl. No.: 13/511,447

(22) PCT Filed: Nov. 19, 2010

(86) PCT No.: PCT/JP2010/070692
§ 371 (c)(1),
(2), (4) Date: May 23, 2012

(87) PCT Pub. No.: WO2011/065306
PCT Pub. Date: Jun. 3, 2011

(65) Prior Publication Data
US 2012/0275990 A1    Nov. 1, 2012

(30) Foreign Application Priority Data
Nov. 26, 2009    (JP) .................................. 2009-268240

(51) Int. Cl.
*C01G 25/02*    (2006.01)
*C01G 27/02*    (2006.01)
(Continued)

(52) U.S. Cl.
CPC ............. *C01G 23/04* (2013.01); *C01P 2002/72* (2013.01); *C01P 2002/84* (2013.01); *C01P 2004/03* (2013.01); *C01P 2004/04* (2013.01); *C01P 2004/16* (2013.01); *C01P 2004/64* (2013.01); *B82Y 30/00* (2013.01)

(58) Field of Classification Search
None
See application file for complete search history.

(56) References Cited

U.S. PATENT DOCUMENTS 4,422,917 A * 12/1983 Hayfield .................. 204/196.01

FOREIGN PATENT DOCUMENTS

| JP | 2005-538921 A | 12/2005 |
| JP | 2006-517619 A | 7/2006 |

(Continued)

OTHER PUBLICATIONS

Zhao et al(Preparation of TiO2 nanoneedles sol via surfactant assisted hydrothermal synthesis, Chinese Journal of Inorganic Chemistry, 2007, 2, p. 357-360).*

(Continued)

*Primary Examiner* — Melvin C Mayes
*Assistant Examiner* — Michael Forrest
(74) *Attorney, Agent, or Firm* — Locke Lord LLP; James E. Armstrong, IV

(57) ABSTRACT

A microstructure that can develop non-conventional and novel physical properties and a method for producing the same are provided. Ethanol is added to a mixture solution produced by adding a surfactant solution to a peroxotitanic acid aqueous solution to produce precipitates, and the precipitates collected from the mixture solution are let dried to produce precursor powders 5. The precursor powders 5 are calcined at a predetermined temperature. Accordingly, a microstructure 2 can be produced which is formed of monophasic $Ti_4O_7$ in nano size. The microstructure 2 of monophasic $Ti_4O_7$ produced in this fashion can be fine-grained in nano size unlike prior-art crystals.

4 Claims, 12 Drawing Sheets

(51) Int. Cl.
  *C01G 23/04* (2006.01)
  *B82Y 30/00* (2011.01)

(56) References Cited

FOREIGN PATENT DOCUMENTS

| JP | 2007-177142 | A | | 7/2007 | | |
| --- | --- | --- | --- | --- | --- | --- |
| JP | 2007177142 | A | * | 7/2007 | ............... | C09D 1/00 |
| WO | WO-2004/026783 | A1 | | 4/2004 | | |
| WO | WO-2004/064118 | A2 | | 7/2004 | | |
| WO | WO 2004064118 | A2 | * | 7/2004 | | |
| WO | WO-2009/024776 | A1 | | 2/2009 | | |
| WO | WO 2009024776 | A1 | * | 2/2009 | ............. | C01G 23/04 |

OTHER PUBLICATIONS

Hitoshi Sato, et al., "Ti 3*d* Orbital Change Across Metal-Insulator Transition in $Ti_2O_3$: Polarization-Dependent Soft X-ray Absorption Spectroscopy at Ti 2*p* Edge," Journal of the Physical Society of Japan vol. 75, No. 5, May 2006, pp. 053702/1-053702/4.
International Search Report dated Dec. 28, 2010, issued for PCT/JP2010/070692.

* cited by examiner

BEFORE CALCINATION

AFTER CALCINATION

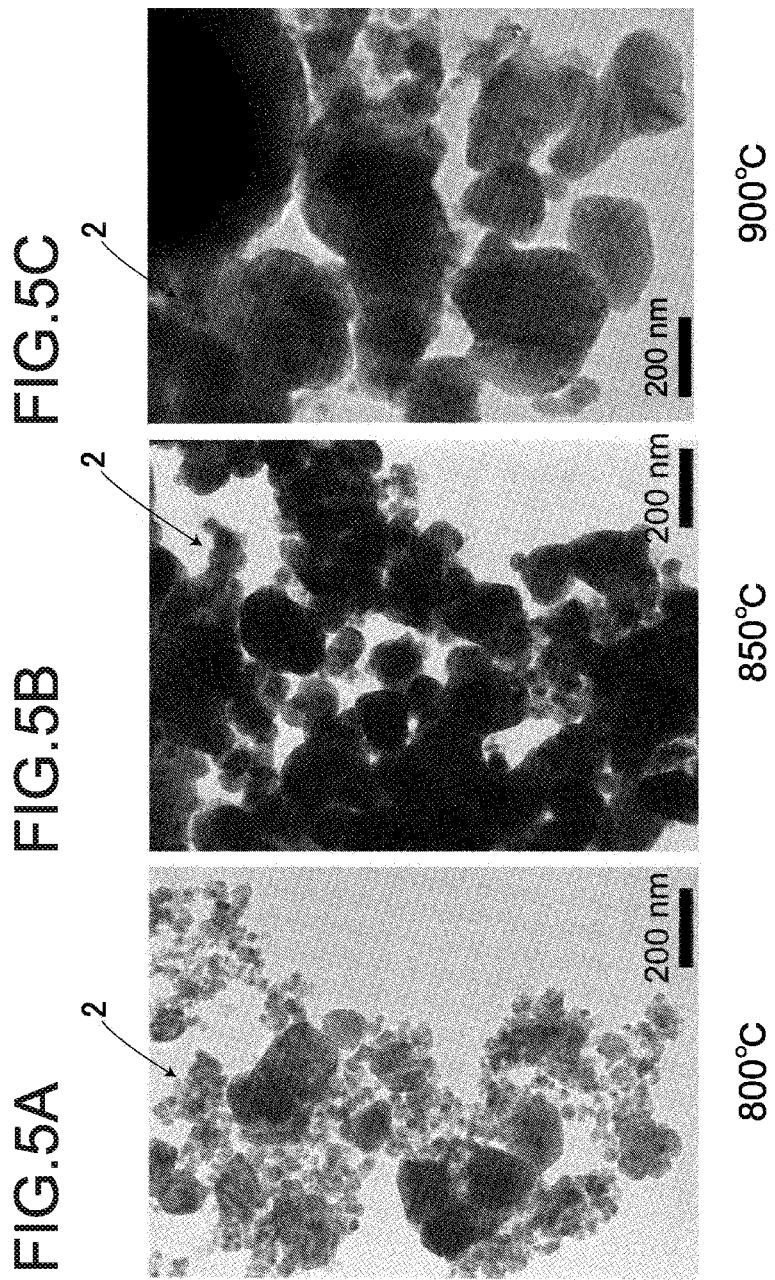

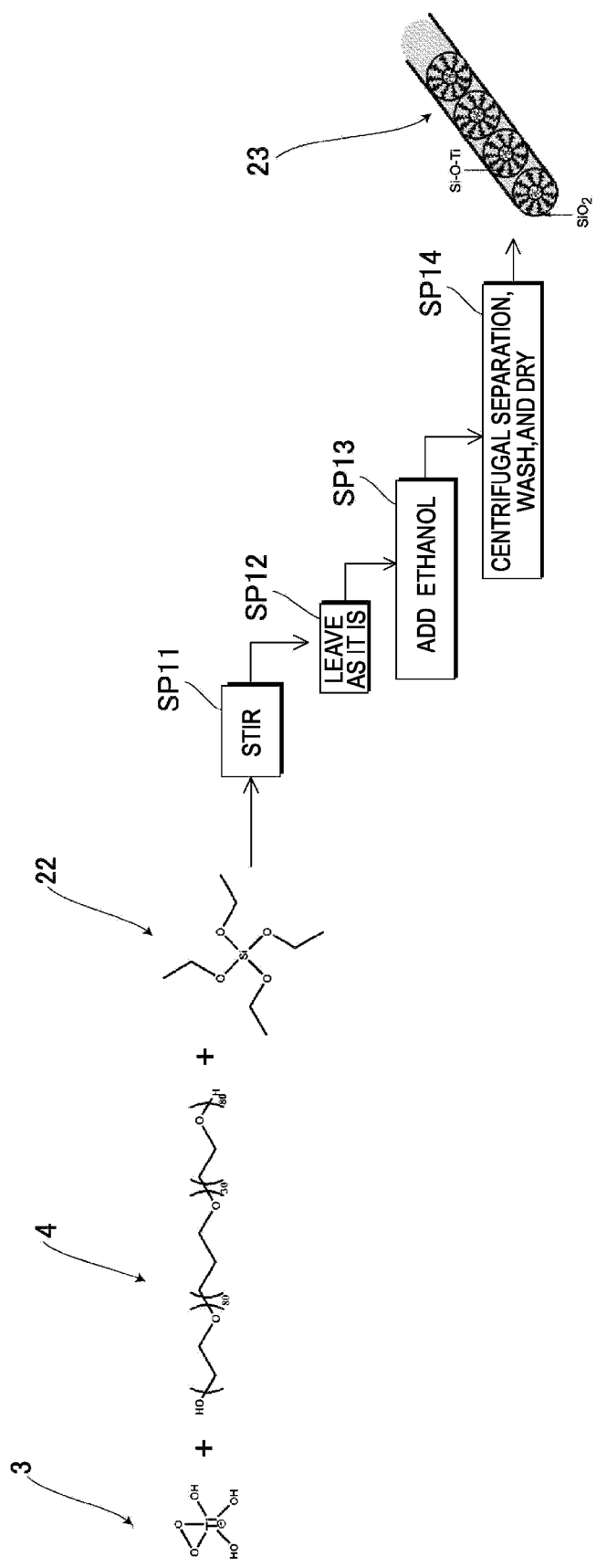

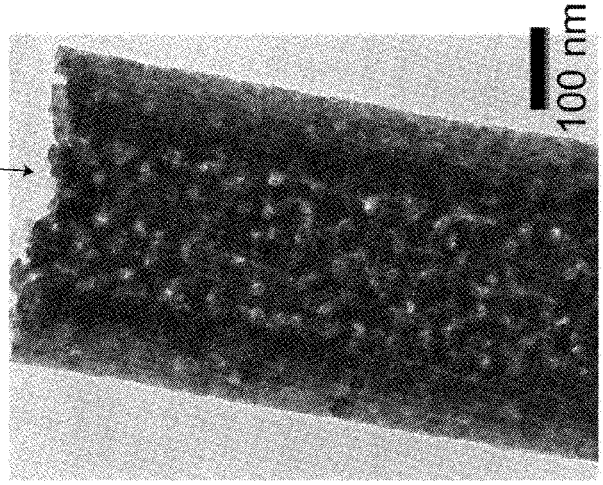
FIG.12A 800°C
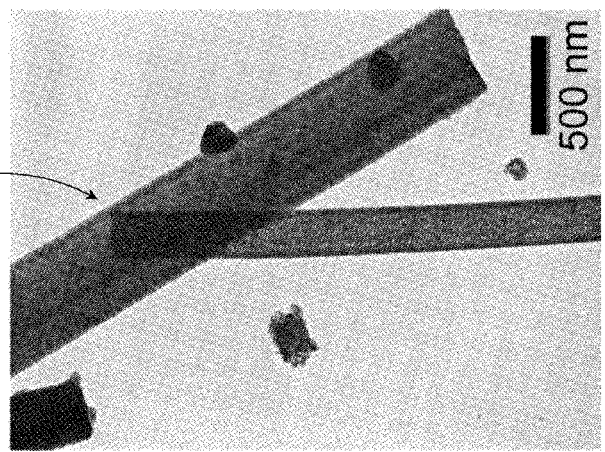
FIG.12B 850°C
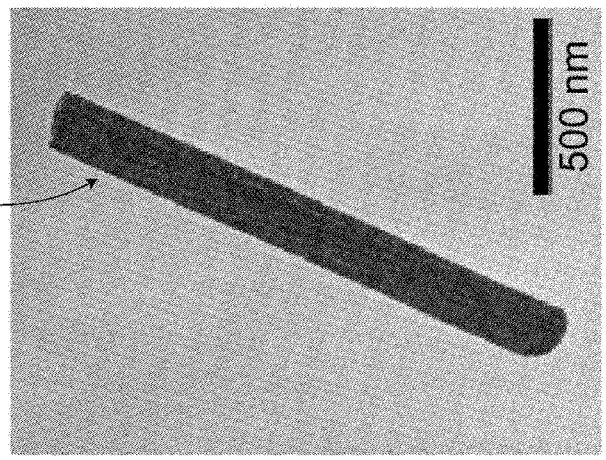
FIG.12C 900°C

MICROSTRUCTURE AND MANUFACTURING METHOD THEREFOR

CROSS REFERENCE TO RELATED APPLICATIONS

This application is a 371 US National Phase Application of PCT/JP2010/070692 filed Nov. 19, 2010, which claims priority to Japanese Patent Application No. 2009-268240, filed Nov. 26, 2009, the disclosures of each of which are expressly incorporated herein by reference in their entireties.

TECHNICAL FIELD

The present invention relates to a microstructure and a method for producing the same, and is suitable for a microstructure containing an oxidized material like $Ti^{3+}$ (hereinafter, referred simply to as titanium oxide).

BACKGROUND ART $Ti_2O_3$ that is a typical of titanium oxide is a phase transition material with various interesting physical properties, and is known that such a material causes, for example, metal-insulator transition, and paramagnetism-antiferromagnetism transition. Moreover, $Ti_2O_3$ is also known with an infrared absorption effect, a thermoelectric effect, and a magnetoelectric (ME) effect, etc., and recently, in addition to those effects, a magnetic resistance (MR) effect is found. Such various physical properties are researched for only a bulk body (up to μm size) (see, for example, non-patent literature 1), and the major mechanisms of such effects are still unknown.

CITATION LIST

Non Patent Literature

Non-Patent Literature 1: Hitoshi SATO, et al., JOURNAL OF THE PHYSICAL SOCIETY OF JAPAN Vol. 75, No. 5, May, 2006, pp. 053702/1-4

SUMMARY OF THE INVENTION

Technical Problem

Regarding how to synthesize such titanium oxide according to the conventional technology, calcinations at a temperature of substantially 1600° C. is performed, $TiO_2$ is subjected to carbon reduction at a temperature of substantially 700° C. in vacuum, and $TiO_2$, $H_2$, $TiCl_4$ are calcined at a temperature of substantially 1000° C. to synthesize a bulk body. There is no report so far for a nanoparticle (nm size) of $TiO_X$ containing $Ti^{3+}$, and it is expected to develop a novel material by making such a bulk body into a nanoparticle.

The present invention has been made in view of the above-explained technical problem and it is an object of the present invention to provide a microstructure and a method for producing the same which can develop a novel physical property.

Solution to Problem

To achieve the object, a first aspect of the present invention provides a microstructure including a micro structure of $Ti_4O_7$ in a nano size, the $Ti_4O_7$ being formed by calcining precursor powders, the precursor powders being formed based on precipitates precipitating in a mixture solution of a surfactant solution containing a non-ionic polymer surfactant agent and a peroxotitanic acid aqueous solution.

According to a second aspect of the present invention, the surfactant solution is added with a silane compound, and the microstructure is a nano-rod structure.

A third aspect of the present invention provides a method for producing a microstructure, the method including: a solution preparing process of mixing a surfactant solution containing a non-ionic polymer surfactant agent with a peroxotitanic acid aqueous solution to prepare a mixture solution; a producing process of separating, from the mixture solution, precipitates precipitating in the mixture solution to produce precursor powders; and a calcinating process of calcining the precursor powders for a predetermined time under a predetermined hydrogen atmosphere, thereby producing the microstructure of $Ti_4O_7$.

According to a fourth aspect of the present invention, the surfactant solution used in the solution preparing process is added with a silane compound, and the microstructure produced by the producing process has a nano-rod structure.

Advantageous Effect of Invention

According to the first and third aspects of the present invention, it becomes possible to provide a microstructure which is formed of $Ti_4O_7$, is formed in a non-conventional micro structure, and can develop novel physical properties and a method for producing the same.

According to the second and fourth aspects of the present invention, it becomes possible to provide a microstructure which is formed of $Ti_4O_7$, is formed in a non-conventional micro and nano-rod shape, and can develop novel physical properties and a method for producing the same.

BRIEF DESCRIPTION OF DRAWINGS

FIG. 5 are TEM images of respective calcined powders produced by calcining the precursor powders of the first embodiment at 800° C., 850° C., and 900° C.;

FIG. 9 is a schematic view showing a production process of precursor powders according to the second embodiment;

FIG. 12 are TEM images of respective microstructures produced by calcining the precursor powders of the second embodiment at 800° C., 850° C., and 900° C.;

REFERENCE SIGNS LIST

2, 21 Microstructure
3 Peroxotitanic acid complex
4 Triblock copolymer
22 Silane compound

DESCRIPTION OF EMBODIMENTS

Preferred embodiments of the present invention will be explained below.

(1) First Embodiment (1-1) Structure of Microstructure of First Embodiment

Figure 1:
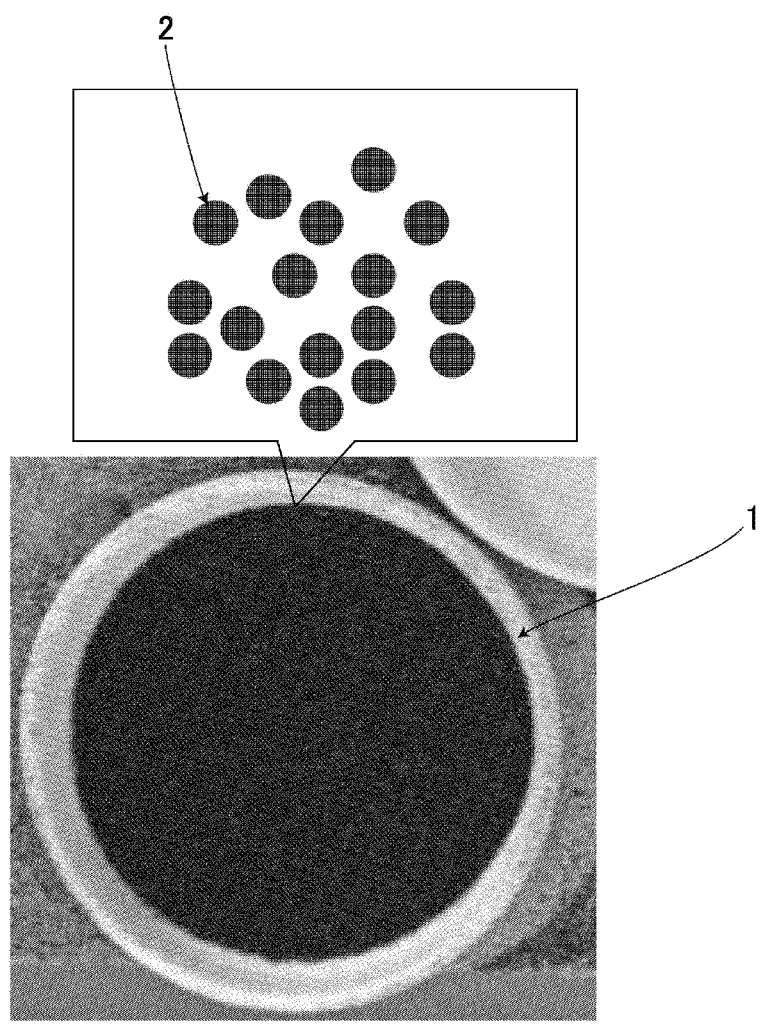
FIG. 1 is a photograph of calcined powders and a schematic view showing a microstructure according to a first embodiment of the present invention.

FIG. 1 is a photograph of an Oxford blue calcined powder 1 formed of a plurality of microstructures 2. The microstructure 2 of the first embodiment is a spherical particle, is formed in nano size to have a particle size of substantially 25 to 100 nm, and has a composition of $Ti_4O_7$ of magneli structure. Unlike the bulk structure (hereinafter, referred to as a prior-art crystal) of the conventionally well-known oxidation products, the microstructure 2 of the present invention has a feature that it is a nano fine particle in nano size.

(1-2) Production of Microstructure according to First Embodiment

Figure 2:
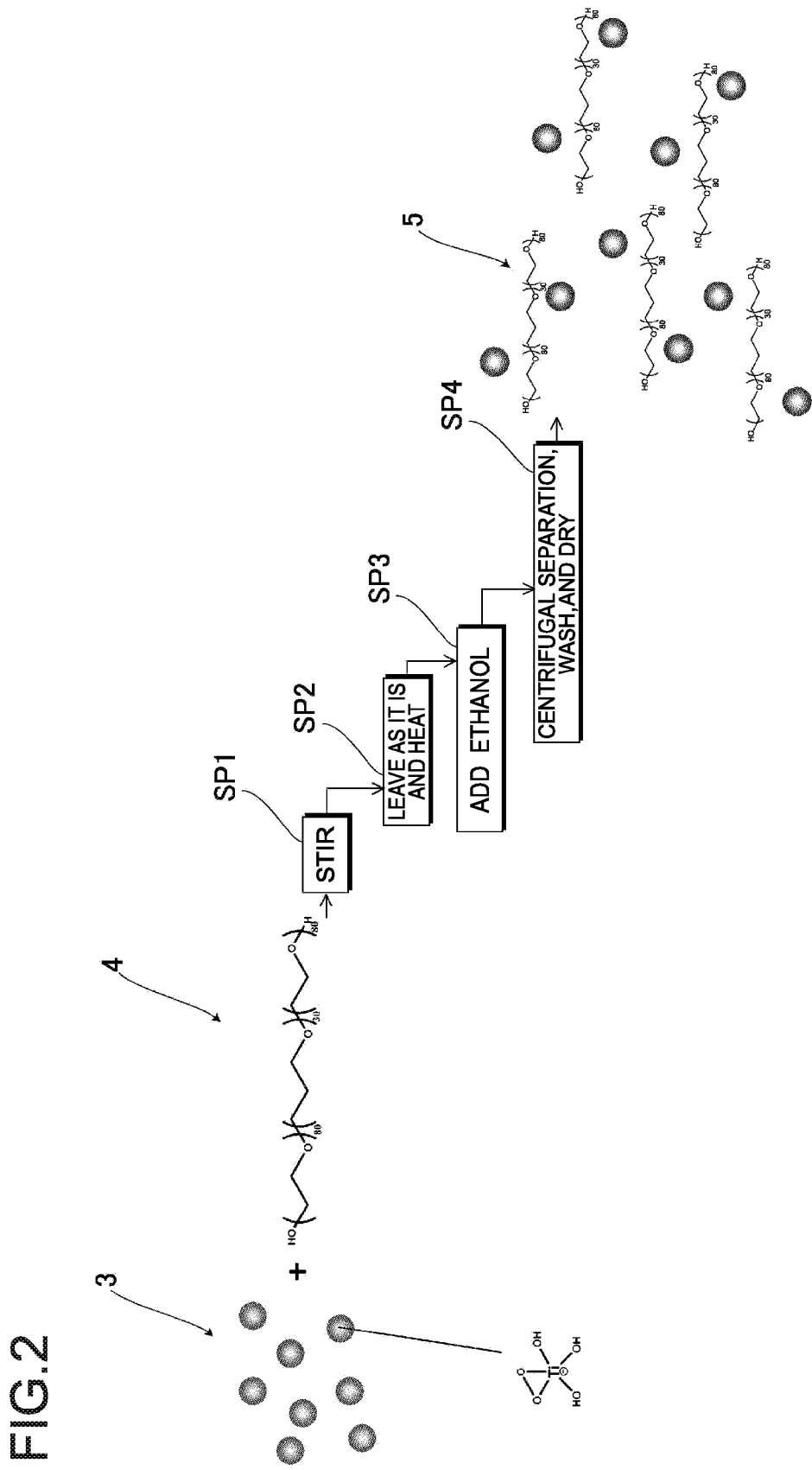
FIG. 2 is a schematic view showing a production process of precursor powders according to the first embodiment.

More specifically, first, $H_2O_2$ and ammonium aqueous solution are added to Ti powders, and are stirred until a yellow and transparent $(NH_4)[Ti(O_2)(OH)_3]$ solution (hereinafter, referred to as a peroxotitanic acid aqueous solution) is obtained. In this peroxotitanic acid aqueous solution, peroxotitanic acid complex $([Ti(O_2)(OH)_3]^-)$ 3 shown in FIG. 2 is produced.

Separately from this solution, a solution (hereinafter, referred to as a surfactant solution) obtained by dissolving triblock copolymer 4 that is a non-ionic polymer surfactant agent in water is produced. The triblock copolymer 4 employs a structure (poly(ethyleneoxide)-poly(propyleneoxide)-poly(ethyleneoxide)) in which hydrophobic poly(propyleneoxide) chains are disposed between hydrophilic poly(ethyleneoxide) chains, and for example, a product name Pluronic F68 (MP Biochemicals Co., Ltd.) [$(PEO_{80}$-$PPO_{30}$-$PEO_{80})$] ([$HO(CH_2CH_2O)_{80}(CH_2CH_2CH_2O)_{30}(CH_2CH_2O)_{80}H$]) can be used.

Next, the surfactant solution is added to the peroxotitanic acid aqueous solution and mixed together, and stirred for a predetermined time at a room temperature, thereby producing a mixture solution (step SP1). Next, the mixture solution is left as it is for a predetermined time at a room temperature (step SP2). Thereafter, the solution is heated by a hot bath of 70° C. to expel hydrogen peroxide from the solution (step SP2). Subsequently, ethanol is added to the mixture solution, thereby producing yellow precipitates in the mixture solution (step SP3).

Next, the precipitates are taken out from the mixture solution by centrifugal separation, washed by ethanol, and let dried (step SP4), thereby producing yellow precursor powders 5. Finally, under a predetermined hydrogen atmosphere, the precursor powders 5 are calcined for several hours at a predetermined temperature, thereby producing the microstructure 2 of nano fine particle formed of $Ti_4O_7$.

(1-3) Example of First Embodiment

Various examinations and tests were carried out for the microstructure 2 of the present invention specifically produced according to the above-explained production method. First of all, an explanation will be given of a specific production method of the microstructure 2 used for this examination and test, and each examination and test result will be explained next.

(1-3-1) Production of Microstructure of First Embodiment

First, as is indicated by the following formula 1, 160 mL of 30% $H_2O_2$ and 40 mL of 28% ammonium aqueous solution ($NH_3$ aqueous solution) were added to 2.0 g (42 mmol) of Ti powders, and stirred for substantially two hours in an ice bath (0 to 5° C.), thereby producing a yellow and transparent peroxotitanic acid aqueous solution containing peroxotitanic acid complex ($[Ti(O_2)(OH)_3]^-$) 3.

[Formula 1]

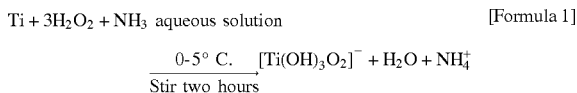

Separately from this solution, 2 g (0.24 mmol) triblock copolymer 4 (product name: Pluronic F68 (MP Biochemicals Co., Ltd.) [$(PEO_{80}$-$PPO_{30}$-$PEO_{80})$] that was a non-ionic polymer surfactant agent was dissolved in 80 mL of water to produce a surfactant solution.

Subsequently, the surfactant solution was added to the peroxotitanic acid aqueous solution, stirred for substantially two to four hours at a room temperature to mix those, thereby producing a mixture solution (step SP1 in FIG. 2). Next, the mixture solution was left as it was for substantially 18 hours at a room temperature (step SP2). Thereafter, the solution was heated by a hot bath at 70° C. to expel the hydrogen peroxide from the solution (step SP2). Next, 60 to 70 mL of ethanol was added to the mixture solution (step SP3). Accordingly, yellow precipitates were produced in the mixture solution.

Figure 3:
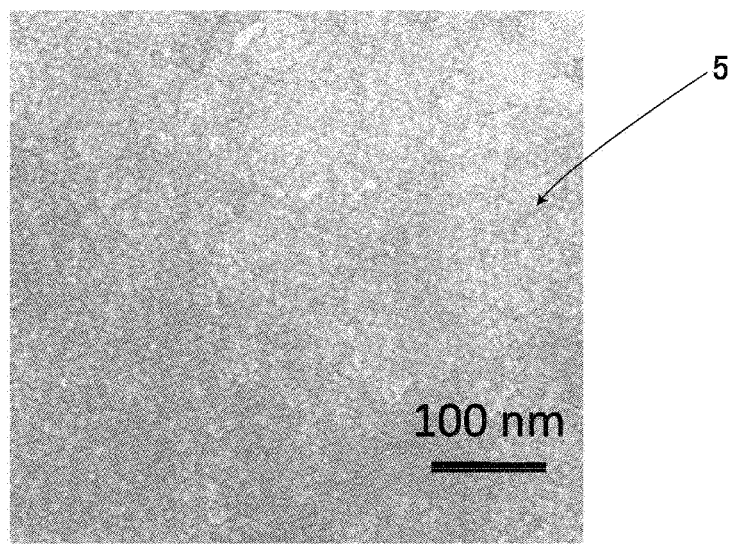
FIG. 3 is a TEM image showing precursor powders.

Next, this mixture solution was subjected to a centrifugal separation by three to four times for substantially five minutes and at a rotation speed of 4000 rev/min to collect precipitates. Next, the collected precipitates were washed by ethanol by three to four times, and let dried for 12 minutes at a temperature of 60° C. to produce yellow precursor powders 5. For the precursor powders 5, a TEM (Transmission Electron Microscope) image as shown in FIG. 3 was obtained. It is confirmed from this TEM image that the precursor powders 5 had the peroxotitanic acid complex 3 uniformly dispersed in the frameworks of the triblock copolymer 4.

Figure 4A:
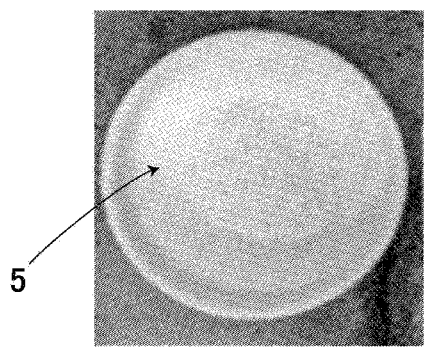
FIG. 4 are photographs showing a precursor powder and a calcined powder.
Figure 4B:
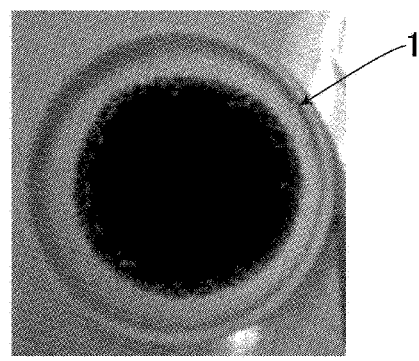

Next, three sets of precursor powders 5 were produced through the above-explained production method, and the precursor powders 5 were calcined for substantially five hours at different temperatures of 800° C., 850° C., and 900° C. under a hydrogen atmosphere of a hydrogen flow rate of 3 L/min, and three kinds of calcined powders 1 were produced. FIG. 4A is a photograph of a yellow precursor powder 5 before calcination and FIG. 4B is a photograph of an Oxford blue calcined powder 1 that is the calcined precursor powder.

(1-3-2) Examination Result

Next, TEM images for the three kinds of calcined powders 1 were checked. FIG. 5A is a TEM image of the calcined powders 1 obtained when the precursor powders 5 were calcined at a temperature of 800° C. FIG. 5B is a TEM image of the calcined powders 1 obtained when the precursor powders 5 were calcined at a temperature of 850° C. FIG. 5C is a TEM image of the calcined powders 1 obtained when the precursor powders 5 were calcined at a temperature of 900° C.

It is confirmed that from the TEM images of FIGS. 5A, 5B, and 5C, the microstructure 2 obtained by calcination of 800°

C. had a particle size of substantially 25 nm, the microstructure 2 obtained by calcination of 850° C. had a particle size of substantially 50 nm, and the microstructure 2 obtained by calcination of 900° C. had a particle size of substantially 100 nm. As explained above, it is confirmed that when the calcining temperature increases, the microstructure 2 has a larger particle size. Therefore, it became clear that to produce the microstructure 2 with a small particle size, the calcining temperature of the precursor powders 5 should be lowered.

Figure 6:
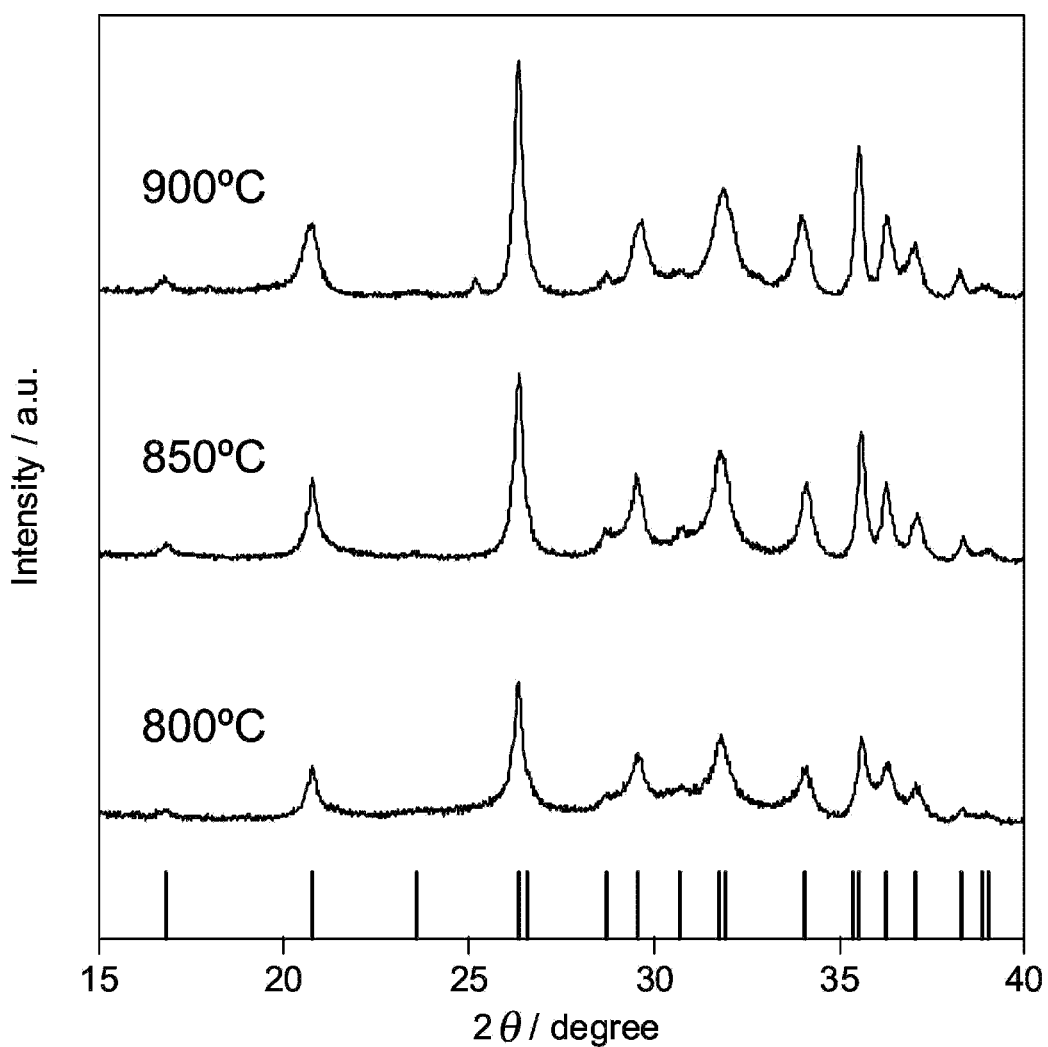
FIG. 6 is a graph showing an XRD pattern of each calcined powder produced by calcining the precursor powders of the first embodiment at 800° C., 850° C., and 900° C.

Next, XRD (X-ray diffraction) patterns of respective calcined powders 1 produced by calcining the precursor powders 5 at temperatures of 800° C., 850° C., and 900° C., respectively, were examined. Results as shown in FIG. 6 were obtained. In FIG. 6, below respective temperature indications of 800° C., 850° C., and 900° C., corresponding XRD patterns are indicated.

As shown in FIG. 6, it is confirmed that the calcined powders 1 produced by calcining the precursor powders 5 at a temperature of 800° C. were inherent from $Ti_4O_7$ of triclinic crystal. Hence, it is also confirmed that $Ti_4O_7$ can be formed even if the precursor powders were calcined at a low temperature of 800° C.

Moreover, it is also confirmed that the calcined powders 1 obtained by calcining the precursor powders 5 at temperatures of 850° C. or 900° C. were inherent from $Ti_4O_7$ based on respective XRD patterns shown in FIG. 6. It is confirmed that the microstructure 2 of the present invention can be produced within a wide temperature range from 800 to 900° C. that are a temperature when the precursor powders 5 are calcined.

(1-3-3) Visible Light Absorption Spectra of Respective Calcined Powders

Figure 7:
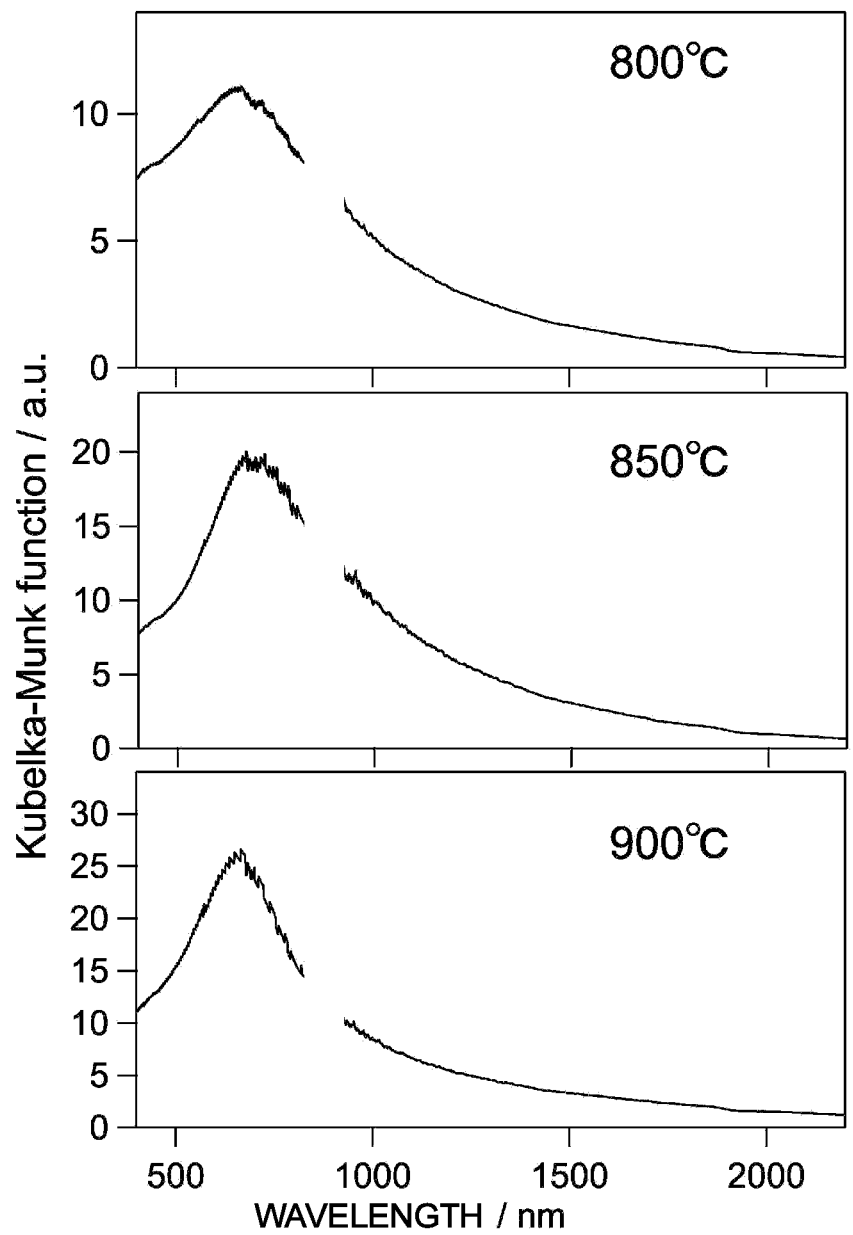
FIG. 7 is a graph showing visible light absorption spectra of respective calcined powders according to the first embodiment.

Next, respective visible light absorption spectra of three kinds of calcined powders 1 produced by calcining the precursor powders 5 at the temperatures of 800° C., 850° C., and 900° C., were measured, and results shown in FIG. 7 were obtained. The reflectance R of each calcined powder 1 was measured by a spectrophotometric colorimetry gauge, and a calculated value was obtained through the Kubelka-Munk formula based on the reflectance R that was the measured result, and the calculated value was indicated in the vertical axis of FIG. 7. The Kubelka-Munk formula can be expressed as Kubelka-Munk function/au=$(1-R)^2/2R$, and is a formula for obtaining the light absorption of a sample through diffuse reflection light. It becomes clear from the result shown in FIG. 7 that each kind of calcined powders 1 had a d-d transition ($^2B_{2g} \rightarrow ^2A_{1g}, ^2B_{1g}$) of $Ti^{III}$ near 650 nm.

(1-4) Action and Advantage

In the above-explained structure, according to the production method of the present invention, ethanol is added to the mixture solution produced by adding surfactant solution into the peroxotitanic acid aqueous solution to produce precipitates, and precipitates collected from the mixture solution are let dried to produce the precursor powders 5, and the precursor powders 5 are calcined at a predetermined temperature.

Hence, according to this production method, it is possible to produce the microstructure 2 formed of monophasic $Ti_4O_7$ and formed in nano size. The microstructure 2 of monophasic $Ti_4O_7$ produced as explained above can be a fine particle in nano size unlike the prior-art crystal, and has a novel micro structure.

Figure 8B:
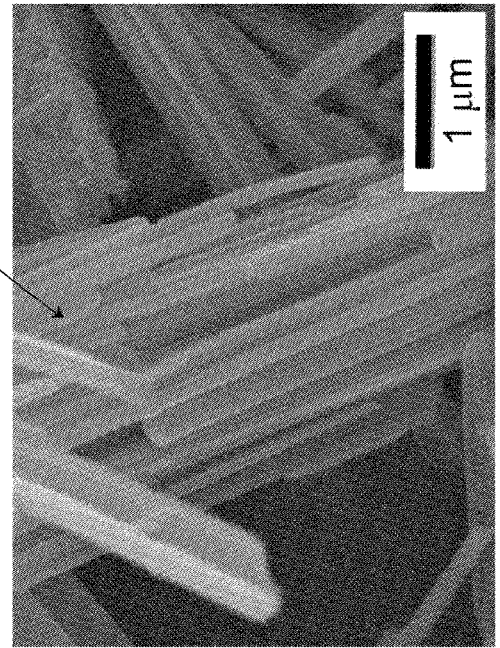
FIG. 8 are SEM images showing a microstructure according to a second embodiment of the present invention.
Figure 8A:
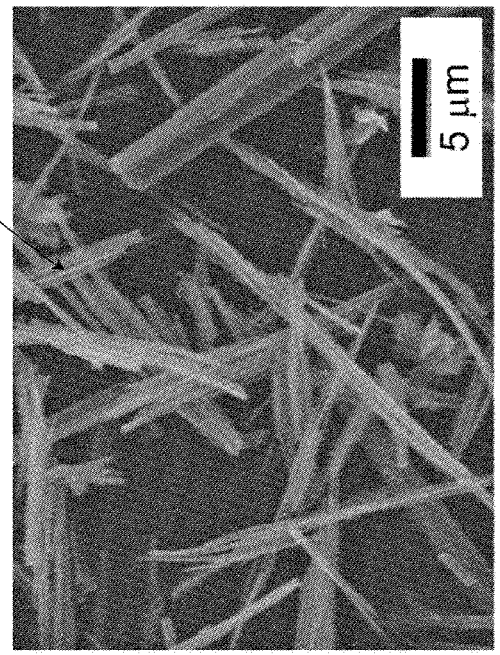

(2) Second Embodiment (2-1) Structure of Microstructure according to Second Embodiment FIG. 8 are SEM (Scanning Electron Microscope) images of microstructures 21 according to a second embodiment. The microstructure 21 differs from the first embodiment that the microstructure is formed of a cylindrical nano-rod, has a length of substantially several μm and has a diameter of substantially 100 to 500 nm, and also has a composition of $Ti_4O_7$ of magneli structure. The microstructure 21 of this embodiment has a feature that it is formed in a nano-rod shape that is fine-grained in nano size unlike the prior-art crystal conventionally known.

The microstructure 21 can be produced by adding a silane compound, such as tetraethoxysilane (TEOS($(C_2H_5O)_4Si$) into the surfactant solution during the production process of the first embodiment. The microstructure 21 of the nano-rod structure formed of monophasic $Ti_4O_7$ can be produced through the following production method.

(2-2) Production Method of Microstructure of Second Embodiment

First, $H_2O_2$ and ammonium aqueous solution are added to Ti powders, and are stirred until a yellow and transparent $(NH_4)[Ti(O_2)(OH)_3]$ solution (i.e., the peroxotitanic acid aqueous solution) is obtained. In this peroxotitanic acid aqueous solution, peroxotitanic acid complex ($[Ti(O_2)(OH)_3]^-$) 3 shown in FIG. 9 can be produced.

Separately from this solution, according to the second embodiment, silane compounds 22 like tetraethoxysilane (TEOS) are added in a solution (i.e., a surfactant solution) obtained by dissolving triblock copolymer 4 that is a non-ionic polymer surfactant agent in water.

The following production procedures are the same as those of the first embodiment, and as shown in FIG. 9, a surfactant solution is added to the peroxotitanic acid aqueous solution to mix those solutions, and those solutions are stirred for a predetermined time at a room temperature, thereby producing a mixture solution (step SP11). Next, the mixture solution is left as it is for a predetermined time at a room temperature (step SP12). Thereafter, ethanol is added to this mixture solution, thereby producing yellow precipitates in the mixture solution (step SP13).

Moreover, the precipitates are collected from the mixture solution by centrifugal separation, and washed by ethanol, and let dried (step SP14), thereby producing yellow precursor powders formed of a plurality of precursors 23 in a nano-rod shape. Finally, under a predetermined hydrogen atmosphere, the precursor powders are calcined at a predetermined temperature for several hours, thereby producing the microstructures 21 in a nano-rod structure formed of $Ti_4O_7$.

(2-3) Example of Second Embodiment

Various examinations and tests were carried out for the microstructures 21 of the second embodiment specifically produced in accordance with the above-explained production method. First of all, an explanation will be given of the specific production method of the microstructure 21 used for the examination and test, and each examination and test result will be explained next.

(2-3-1) Production of Microstructure of Second Embodiment

In this case, first, as is indicated by the above-explained formula 1, 160 mL of 30% $H_2O_2$ and 40 mL of 28% ammonium aqueous solution were added to 2.0 g (42 mmol) of Ti powders, and stirred for substantially two hours in an ice bath (0 to 5° C.), thereby producing a yellow and transparent peroxotitanic acid aqueous solution containing peroxotitanic acid complex ($[Ti(O_2)(OH)_3]^-$) 3.

Separately from this solution, 2 g (0.24 mmol) of triblock copolymer 4 (product name: Pluronic F68 (MP Biochemicals Co., Ltd.) [($PEO_{80}$-$PPO_{30}$-$PEO_{80}$)] that was a non-ionic polymer surfactant agent, and 0.23 mol of tetraethoxysilane (TEOS) were dissolved in 80 mL of water to produce a surfactant solution.

Subsequently, the surfactant solution was added to the peroxotitanic acid aqueous solution, stirred for substantially four hours at a room temperature to mix those, thereby producing a mixture solution (step SP11 in FIG. 9). Next, the mixture solution was left as it was for substantially 18 hours at a room temperature (step SP12). Next, 60 to 70 mL of ethanol was added to the mixture solution (step SP13). Accordingly, yellow precipitates were produced in the mixture solution.

Figure 10:
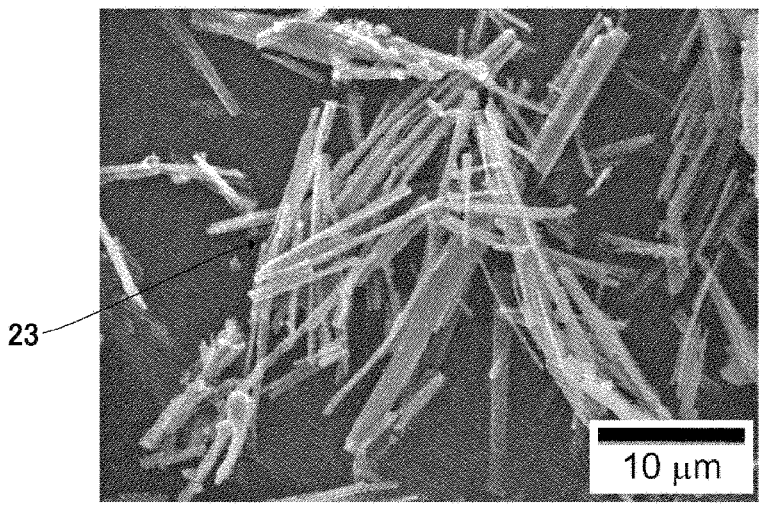
FIG. 10 is an SEM image of precursors according to the second embodiment.
Figure 11A:
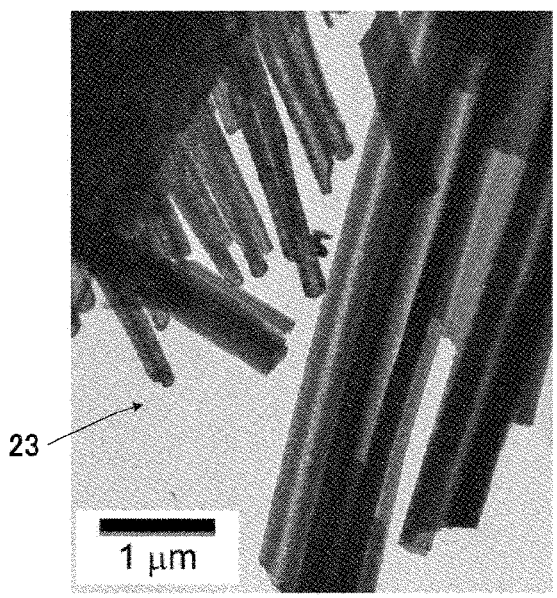
FIG. 11 are TEM images of the precursors according to the second embodiment.
Figure 11B:
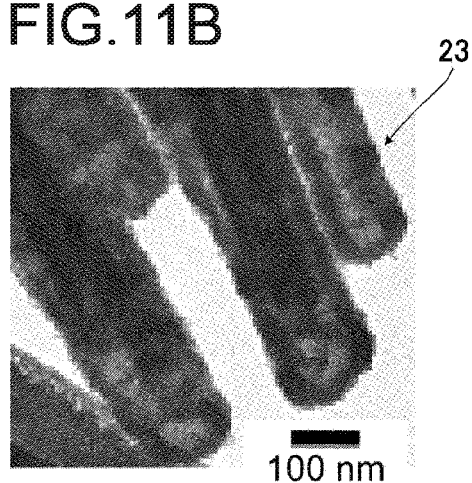

Next, this mixture solution was subjected to a centrifugal separation by three to four times for substantially five minutes and at a rotation speed of 4000 rev/min to collect the precipitates. Next, the collected precipitates were washed by ethanol by three to four times, and let dried for 12 minutes at a temperature of 60° C. to produce yellow precursor powders. FIG. 10 is an SEM image of precursors 23 in the precursor powders, FIGS. 11A and 11B are TEM images of the precursors 23. It becomes clear from the SEM image of FIG. 10 and the TEM images of FIGS. 11A and 11B that each precursor 23 of the precursor powders was in nano size, and formed in a rod shape (a cylindrical shape).

Next, three sets of precursor powders were produced through the above-explained production method, and the precursor powders were calcined for substantially five hours at different temperatures of 800° C., 850° C., and 900° C. under a hydrogen atmosphere of a hydrogen flow rate of 3 L/min, and three kinds of calcined powders were produced.

(2-3-2) Examination Result

Next, TEM images for the three kinds of calcined powders were checked. FIG. 12A is a TEM image of the microstructure 21 obtained when the precursor powders were calcined at a temperature of 800° C. FIG. 12B is a TEM image of the microstructure 21 obtained when the precursor powders were calcined at a temperature of 850° C. FIG. 12C is a TEM image of the microstructure 21 obtained when the precursor powders were calcined at a temperature of 900° C. It is confirmed from the TEM images of FIGS. 12A, 12B, and 12C that the precursor 23 maintained the rod shape even if the precursor powders were calcined at temperatures of 800° C., 850° C., and 900° C. Moreover, it is confirmed that the microstructure 21 was formed in a size having a length of substantially several μm and a diameter of substantially 100 to 500 nm, and had a nano-rod structure. The above-explained FIG. 8 is an SEM image of the microstructure 21 obtained when the precursor powders were calcined at a temperature of 850° C.

Figure 13:
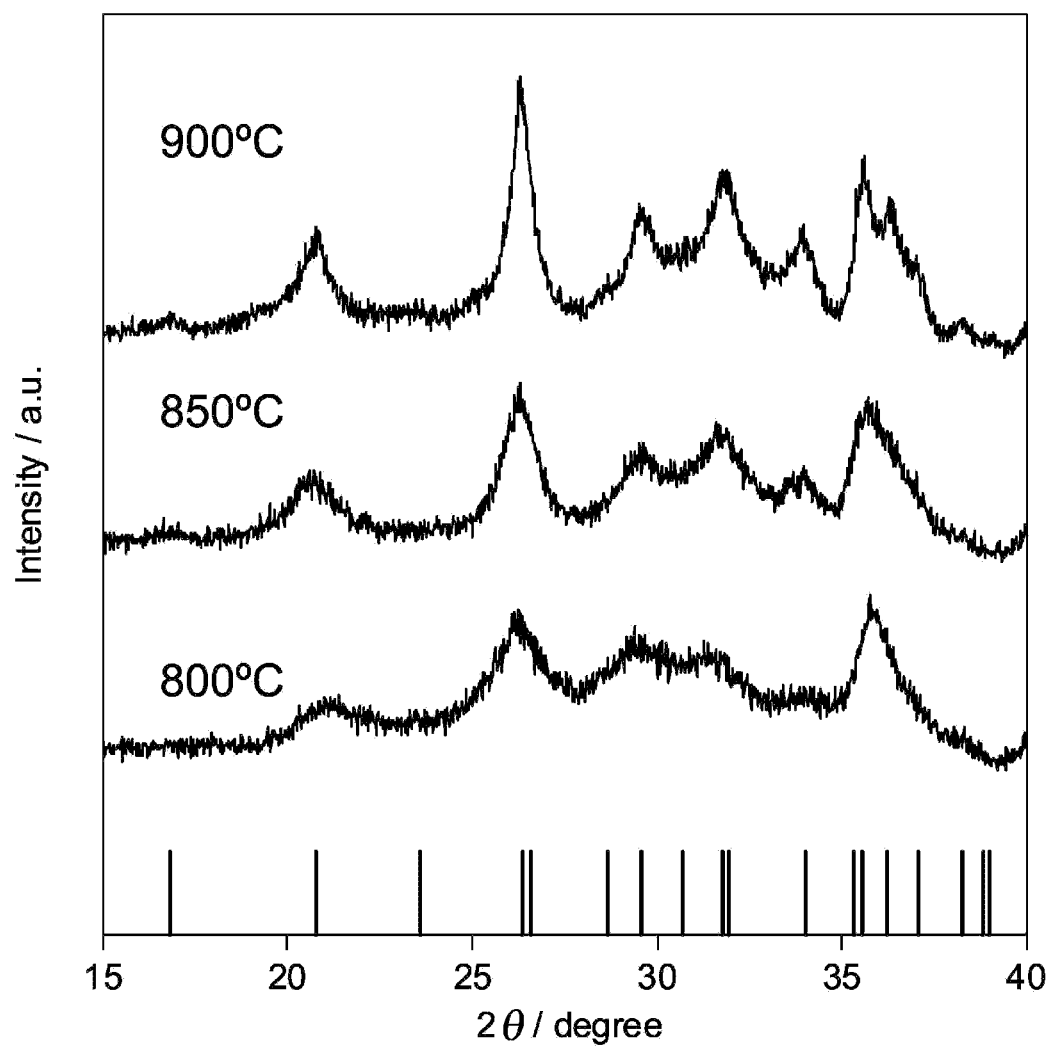
FIG. 13 is a graph showing an XRD pattern of each calcined powder produced by calcining the precursor powders of the second embodiment at 800° C., 850° C., and 900° C.

Next, XRD patterns of respective calcined powders produced by calcining the precursor powders at temperatures of 800° C., 850° C., and 900° C., respectively, were examined. Results as shown in FIG. 13 were obtained. In FIG. 13, below respective temperature indications of 800° C., 850° C., and 900° C., corresponding XRD patterns are indicated.

As shown in FIG. 13, it is confirmed that the calcined powders produced by calcining the precursor powders at a temperature of 800° C. were inherent from $Ti_4O_7$ of triclinic crystal. Hence, it is also confirmed that the microstructure 21 of $Ti_4O_7$ can be formed even if the precursor powders were calcined at a low temperature of 800° C.

Moreover, it is also confirmed that the calcined powders obtained by calcining the precursor powders at temperatures of 850° C. or 900° C. were inherent from $Ti_4O_7$ based on respective XRD patterns shown in FIG. 13. Hence, it is confirmed that the microstructure 21 of the present invention can be produced within a wide temperature range from 800 to 900° C. that are a temperature when the precursor powders are calcined.

No peak of $SiO_2$ was observed as a crystal phase. An ICP-MS (Inductively Coupled Plasma Mass Spectrometer) measurement was carried out for each kind of calcined powders, and the mass ratio of $Ti_4O_7:SiO_2$ was 94:6 wt %.

(2-3-3) Visible Light Absorption Spectra of Respective Calcined Powders

Figure 14:
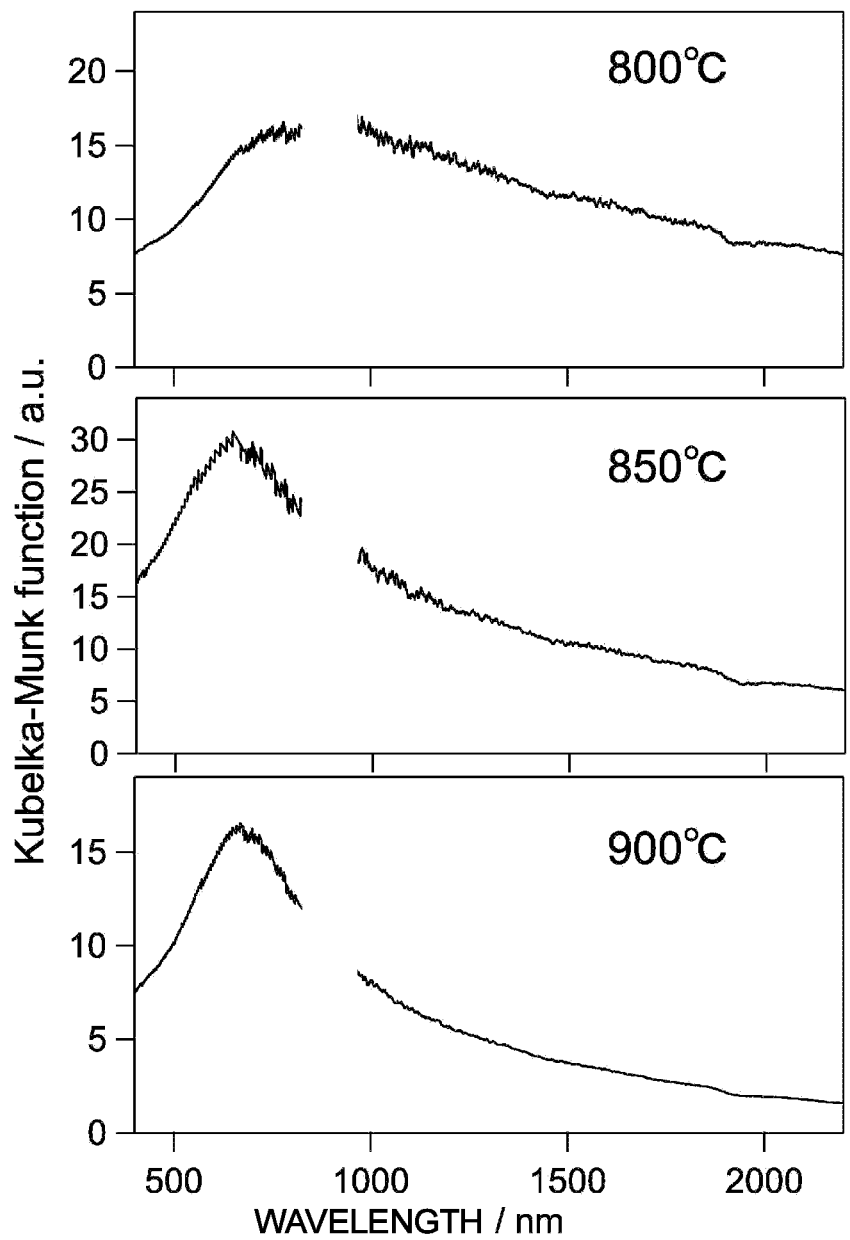
FIG. 14 is a graph showing visible light absorption spectra of respective calcined powders of the second embodiment.

Next, respective visible light absorption spectra of three kinds of calcined powders produced by calcining the precursor powders 5 at the temperatures of 800° C., 850° C., and 900° C., were measured, and results shown in FIG. 14 were obtained. Like the first embodiment, the reflectance R of each calcined powder was measured by a spectrophotometric colorimetry gauge, and a calculated value was obtained through the Kubelka-Munk formula based on the reflectance R that was the measured result, and the calculated value was indicated in the vertical axis of FIG. 14. It becomes clear from the result shown in FIG. 14 that each kind of calcined powders had a d-d transition ($^2B_{2g} \rightarrow {}^2A_{1g}$, $^2B_{1g}$) of $Ti^{III}$ near 650 nm.

(2-4) Action and Advantage

In the above-explained structure, according to the production method of the second embodiment of the present invention, the surfactant solution added with a silane compound 22 like tetraethoxysilane (TEOS) is added to the peroxotitanic acid aqueous solution to produce the mixture solution, and ethanol is added to this mixture solution to produce the precipitates. The precipitates collected from the mixture solution are let dried to produce the precursors 23, which are calcined at a predetermined temperature.

Hence, according to this production method, it is possible to produce the microstructures 21 formed of monophasic $Ti_4O_7$ and in a rod shape in nano size. The microstructures 21 of monophasic $Ti_4O_7$ produced in this fashion have a nano-rod structure that is fine-grained in nano size unlike the prior-art crystal, and have a novel micro structure.

The present invention is not limited to the above-explained embodiments, and for example, the time for leaving the mixture solution as it is in the steps SP2 and SP12, a temperature of calcining the precursor powders, and a calcinating time, etc., can be changed and modified variously within the scope and spirit of the present invention.

The invention claimed is:

1. A microstructure comprising a micro structure of $Ti_4O_7$ in a nano size, the $Ti_4O_7$ being formed by calcining precursor powders, the precursor powders being formed based on precipitates precipitating in a mixture solution of a surfactant solution containing a non-ionic polymer surfactant agent and a peroxotitanic acid aqueous solution.

2. The microstructure according to claim 1, wherein
the surfactant solution is added with a silane compound, and
the microstructure is a nano-rod structure.

3. A method for producing a microstructure, the method comprising:
a solution preparing process of mixing a surfactant solution containing a non-ionic polymer surfactant agent with a peroxotitanic acid aqueous solution to prepare a mixture solution;
a producing process of separating, from the mixture solution, precipitates precipitating in the mixture solution to produce precursor powders; and
a calcinating process of calcining the precursor powders for a predetermined time under a predetermined hydrogen atmosphere, thereby producing the microstructure of $Ti_4O_7$.

4. The method for producing the microstructure according to claim 3, wherein
the surfactant solution used in the solution preparing process is added with a silane compound, and
the microstructure produced by the producing process has a nano-rod structure.

* * * * *